United States Patent
Liao

(10) Patent No.: US 9,261,981 B2
(45) Date of Patent: Feb. 16, 2016

(54) PORTABLE ELECTRONIC DEVICE AND ROTATION DETECTION METHOD THEREOF

(71) Applicant: HTC Corporation, Taoyuan County (TW)

(72) Inventor: Chi-Yi Liao, Taoyuan County (TW)

(73) Assignee: HTC CORPORATION, Taoyuan (TW)

(*) Notice: Subject to any disclaimer, the term of this patent is extended or adjusted under 35 U.S.C. 154(b) by 78 days.

(21) Appl. No.: 14/274,421

(22) Filed: May 9, 2014

(65) Prior Publication Data

US 2015/0324014 A1    Nov. 12, 2015

(51) Int. Cl.
*G06F 3/0346* (2013.01)

(52) U.S. Cl.
CPC ................... *G06F 3/0346* (2013.01)

(58) Field of Classification Search
CPC ...................................... G06F 3/0346
USPC ................................ 345/156–184
See application file for complete search history.

(56) References Cited

U.S. PATENT DOCUMENTS

| 2011/0025596 A1* | 2/2011 | Dohta | A63F 13/06 345/156 |
| 2011/0169737 A1* | 7/2011 | Ito | G06F 3/04845 345/158 |
| 2012/0001943 A1* | 1/2012 | Ishidera | G06F 3/0346 345/659 |

* cited by examiner

*Primary Examiner* — Michael Pervan
(74) *Attorney, Agent, or Firm* — Hauptman Ham, LLP

(57) ABSTRACT

A portable electronic device including a display device, an acceleration sensor and a processing unit is provided. The display device has a display surface. The acceleration sensor has a plurality of detecting sensor arrays for detecting a three-dimensional acceleration, and a shift angle smaller than 90 degrees is formed between at least one of the detecting sensor arrays and the display surface. The processing unit is configured to calculate a tilt angle according to the three-dimensional acceleration.

18 Claims, 9 Drawing Sheets

PORTABLE ELECTRONIC DEVICE AND ROTATION DETECTION METHOD THEREOF

BACKGROUND

1. Field of the Disclosure

This disclosure generally relates to a portable electronic device and, more particularly, to a portable electronic device and a rotation detection method capable of detecting the rotation direction when the tilt angle is ±90 degrees.

2. Description of the Related Art

Just as its name implies, a portable electronic device is portable for users, and it also has the merit that a displaying direction of a display device thereof is changeable according to the usage requirement.

For example, referring to FIG. 1A, it shows a portable electronic device rotated with a rotation angle equal to 0 degree and a displaying state of its display device, wherein the display device takes the X'-axis as a vertical axis and the Y'-axis as a horizontal axis for displaying an image. When the portable electronic device is rotated clockwise by 90 degrees as shown in FIG. 1B, the display device changes the Y'-axis as the vertical axis and changes the X'-axis as the horizontal axis for displaying in order to make the displayed image easier to be observed by a user. Accordingly, the user may select a suitable displaying direction to operate the portable electronic device when operating different applications thereby improving the user experience.

However, limited by the detection limitation of an acceleration sensor, the conventional portable electronic device is not able to correctly detect the rotation angle in all conditions. For example, when a display surface of the portable electronic device is parallel to the horizontal plane, i.e. the portable electronic device being put on a table surface or operated by the user in a lying position, as three detection axes of the acceleration sensor 9 (e.g. X, Y and Z) are coincident with three dimensional axes of the conventional portable electronic device (e.g. X', Y' and Z'), as shown in FIGS. 2A and 2B, the acceleration sensor 9 is unable to effectively detect the rotation angle when the Z-axis detection direction thereof is perpendicular to the horizontal plane such that the displayed image by the display device can not be changed according to the rotation of the portable electronic device by the user.

SUMMARY

Accordingly, the present disclosure provides a portable electronic device and a rotation detection method thereof that solves the problem of unable to perform the rotation detection at a vertical tilt angle in the conventional portable electronic device by changing the detection direction of the Z-axis acceleration of an acceleration sensor.

The present disclosure provides a portable electronic device and a rotation detection method thereof that may display an image according to the rotation direction when the portable electronic device is operated within a tilt angle range that is actually operable by the user.

The present disclosure provides a portable electronic device including a display device, an acceleration sensor, a processing unit, a first circuit board and a second circuit board. The display device has a display surface and is configured to display an image. The acceleration sensor is configured to detect a three-dimensional acceleration. The processing unit is configured to calculate a tilt angle of the portable electronic device in a three-dimensional space according to the three-dimensional acceleration. The first circuit board has a first surface parallel to the display surface, wherein the display device is electrically connected to the first circuit board. The second circuit board is electrically connected to the first circuit board and has a second surface, wherein the second surface and the first surface form a shift angle smaller than 90 degrees therebetween, and the acceleration sensor is disposed on the second surface.

The present disclosure further provides a portable electronic device including a display device, an acceleration sensor and a processing unit. The display device has a display surface and is configured to display an image. The acceleration sensor includes a plurality of detecting sensor arrays and is configured to detect a three-dimensional acceleration, wherein at least one of the plurality of detecting sensor arrays and the display surface form a shift angle smaller than 90 degrees therebetween. The processing unit is configured to calculate a tilt angle of the portable electronic device in a three-dimensional space according to the three-dimensional acceleration.

The present disclosure further provides a rotation detection method for a portable electronic device. The portable electronic device includes a display device, a circuit board and an acceleration sensor electrically coupled to the circuit board. The acceleration sensor is configured to detect a three-dimensional acceleration and includes at least one detecting sensor array having a shift angle smaller than 90 degrees from a display surface of the display device. The rotation detection method includes the steps of: calculating a tilt angle of the portable electronic device in a three-dimensional space according to the three-dimensional acceleration; correcting the tilt angle by the shift angle to generate a corrected tilt angle or correcting a predetermined angle range by the shift angle to generate a corrected angle range; comparing the tilt angle with the corrected angle range or comparing the corrected tilt angle with the predetermined angle range; and calculating a rotation direction according to the three-dimensional acceleration when the tilt angle is within the corrected angle range or the corrected tilt angle is within the predetermined angle range.

In the portable electronic device and the rotation detection method according to some embodiments of the present disclosure, as the acceleration sensor is configured to detect the acceleration in a direction having a shift angle from the display surface, the problem of unable to detect the rotation direction at ±90 degrees of tilt angle in the conventional technology is solved. In addition, a conventional software is applicable to the portable electronic device of the present disclosure by incorporating a corrected angle thereto (i.e. correcting the shift angle) so as to enhance the adaptability of the present disclosure.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 3A:
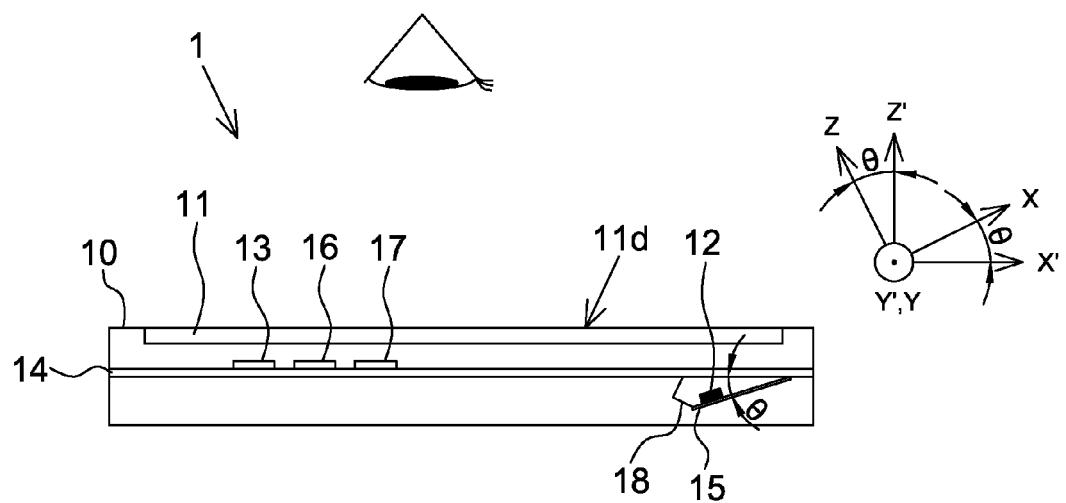
FIG. 3A is a cross sectional view of a portable electronic device according to a first embodiment of the present disclosure.

Referring to FIG. 3A, it is a cross sectional view of a portable electronic device according to a first embodiment of the present disclosure. The portable electronic device 1 according to this embodiment may be, for example, a cell phone, a tablet computer, a personal digital assistance (PDA), a driving video recorder or a global positioning system (GPS), but not limited thereto. The portable electronic device 1 includes a case 10, a display device 11, an acceleration sensor 12, a processing unit 13, a first circuit board 14, a second circuit board 15, a memory unit 16, a power IC 17 and a fixing member 18, wherein the case 10 is configured to protect the elements therein and for being held by a user, and the case 10 is made of suitable material and has a suitable shape without particular limitation.

The first circuit board 14 and the second circuit board 15 may be, for example, hard printed circuit boards on which traces coupled together are formed for transmitting electric signals. For example, the acceleration sensor 12, the processing unit 13, the memory unit 16 and the power IC 17 are electrically coupled through the traces. For example, the second circuit board 15 is fixed on a surface of the first circuit board 14 through a first end thereof and a second end of the second circuit board 15 is separated away from the first circuit board 14 such that a shift angle θ is formed between the second circuit board 15 and the first circuit board 14, e.g. FIG. 3A showing that the second circuit board 15 is disposed on a lower surface of the first circuit board 14. In other embodiments, the second circuit board 15 is fixed on an upper surface of the first circuit board 14. In order to keep the shift angle θ between the second circuit board 15 and the first circuit board 14, a fixing member 18 is further used to be connected between the second end of the second circuit board 15 and the first circuit board 14, and the fixing member 18 may be, for example, a flexible printed circuit board configured to electrically connect the first circuit board 14 and the second circuit board 15, but not limited thereto. As long as the shift angle θ between the second circuit board 15 and the first circuit board 14 is maintained, other fixing means or fixing method may be used to secure the second circuit board 15 on the first circuit board 14 without particular limitation, and the first circuit board 14 is electrically connected to the second circuit board 15 through the first end of the second circuit board 15. In one embodiment, the shift angle θ is between 15 and 35 degrees to allow the portable electronic device 1 is able to correctly detect a rotation angle when a display surface 11d thereof is substantially parallel to the horizontal plane of space, wherein the shift angle θ is determined according to a detectable tilt angle range of the acceleration sensor 12 itself and is not limited to that disclosed in the present disclosure. The upper surface and the lower surface of the first circuit board 14 are substantially parallel to the display surface 11d.

The display device 11 may be, for example, an LCD display panel, an OLED display panel, an LED display panel or the like for displaying an image. The display device 11 has the function of changing a displaying direction of the image. The display device 11 is electrically connected to the first circuit board 14 and has the display surface 11d. A user can see the image displayed by the display device 11 in front of the display surface 11d. According to the direction that the user holds the portable electronic device 1, the display device 11 may change the displaying direction of the image. For illustration purpose, herein a length direction of the portable electronic device 1 is defined as an X'-direction, a width direction of the portable electronic device 1 is defined as a Y'-direction, and a normal direction of the display surface 11d is defined as a Z'-direction. It should be mentioned that said length direction is larger than, smaller than or equal to the width direction without particular limitation.

The acceleration sensor 12 is disposed on an upper surface or a lower surface of the second circuit board 15 for detecting a three-dimensional acceleration, wherein the upper surface and the lower surface of the second circuit board 15 are substantially parallel to each other. As mentioned above, as the second circuit board 15 and the first circuit board 14 form a shift angle θ therebetween, the shift angle θ is also formed between the upper and lower surfaces of the second circuit board 15 and the upper and lower surfaces of the first circuit board 14 as well as the display surface 11d. In one embodiment, the acceleration sensor 12 is a G sensor with the serial number Bosch BMA250E, but not limited thereto.

Figure 3B:
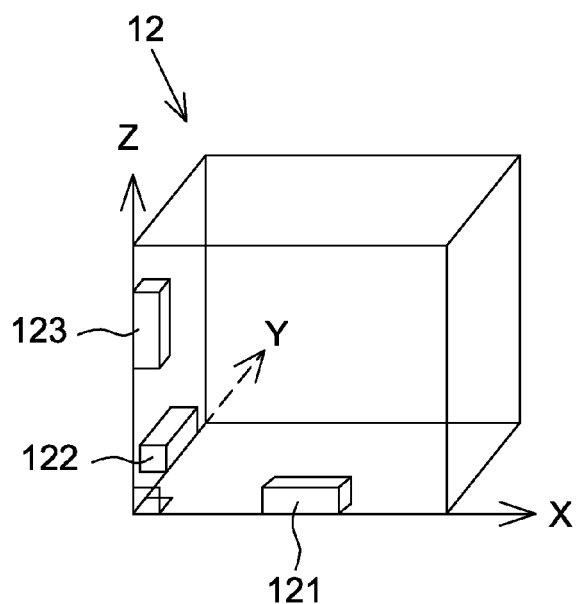
FIG. 3B is a schematic diagram of an acceleration sensor of the portable electronic device according to the first embodiment of the present disclosure.

For example, referring to FIG. 3B, it is a schematic diagram of an acceleration sensor for a portable electronic device according to the first embodiment of the present disclosure. Referring to FIGS. 3A and 3B together, the acceleration sensor 12 of this embodiment includes a first detecting sensor array 121, a second detecting sensor array 122 and a third detecting sensor array 123 respectively configured to detect and output an acceleration value of one of three dimensions, wherein internal structures of the first detecting sensor array 121, the second detecting sensor array 122 and the third detecting sensor array 123 are well known and thus details thereof are not described herein. In this embodiment, for illustration purpose, it is defined that the first detecting sensor array 121 is configured to detect an X-direction acceleration, the second detecting sensor array 122 is configured to detect a Y-direction acceleration and the third detecting sensor array 123 is configured to detect a Z-direction acceleration, wherein the X-direction, the Y-direction and the Z-direction are perpendicular to one another. Accordingly, when the acceleration sensor 12 is disposed on the second circuit board 15 and when the portable electronic device 1 is put on a plane to make the display surface 11d thereof substantially parallel to the horizontal plane of space, the first detecting sensor array 121 and the third detecting sensor array 123 are shifted by the shift angle θ, that is, the X-direction and the Z-direction are respectively shifted from the X'-direction and the Z'-direction by the shift angle θ, whereas the Y-direction is parallel to the Y'-direction (as shown in FIG. 3A).

The processing unit 13, e.g. a central processing unit (CPU), is disposed on the upper surface or the lower surface of the first circuit board 14, and configured to calculate a tilt angle of the portable electronic device 1 in a three-dimensional space according to the three-dimensional acceleration detected by the acceleration sensor 12. For example, it is assumed that the first detecting sensor array 121 detects a first acceleration $a_X$ along the X-direction, the second detecting sensor array 122 detects a second acceleration $a_Y$ along the Y-direction and the third detecting sensor array 123 detects a third acceleration $a_Z$ along the Z-direction. The processing unit 13 is configured to calculate a tilt angle θt according to equation (1) below. In the present disclosure, the tilt angle θt is defined as an angle between the Z'-direction of the display surface 11d and the horizontal plane of space.

$$\theta_t = -\sin^{-1} \frac{a_Z}{\sqrt{a_X^2 + a_Y^2 + a_Z^2}} \quad (1)$$

Figure 4:
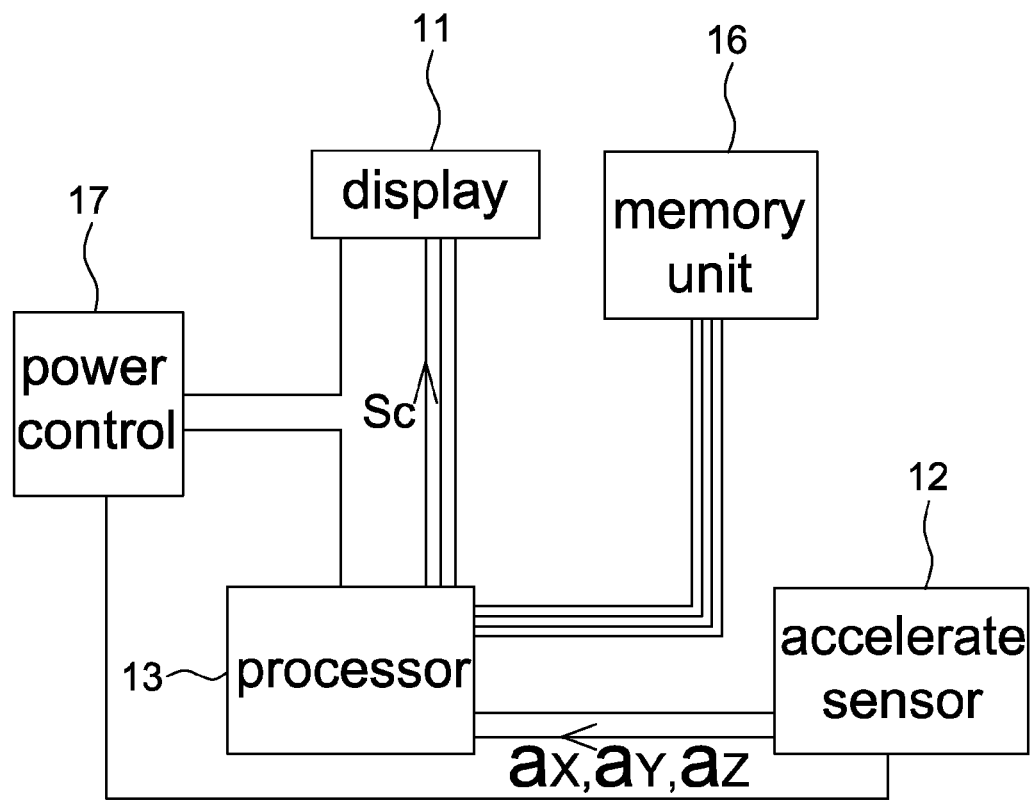
FIG. 4 is a block diagram of a portable electronic device according to one embodiment of the present disclosure.

The memory unit 16 and the power IC 17 are disposed on the upper surface or the lower surface of the first circuit board 14 depending on the traces formed on the first circuit board 14. The power IC 17 is configured to control the power provided to the display device 11, the acceleration sensor 12, the processing unit 13 and the memory unit 16. The memory unit 16 is configured to store information of operable tilt angle, information of operable acceleration range, information of operable rotation angle and other information required in the rotating operation. The display device 11, the acceleration sensor 12, the processing unit 13, the memory unit 16 and the power IC 17 are electrically coupled together through signal lines or the wire bus (i.e. traces) shown in FIG. 4 as an example. It is appreciated that the connection between every element in FIG. 4 is only intended to illustrate but not to limit the present disclosure.

Figure 1A:
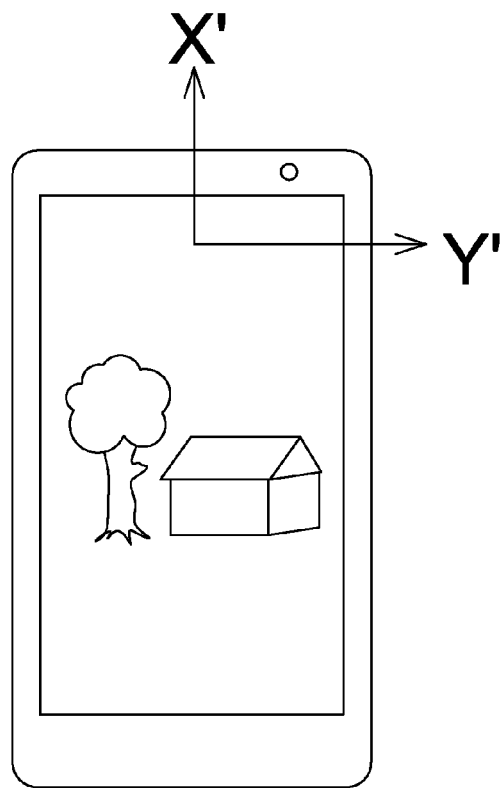
FIGS. 1A and 1B are schematic diagrams of a displayed image at different rotation angles of a portable electronic device.
Figure 1B:
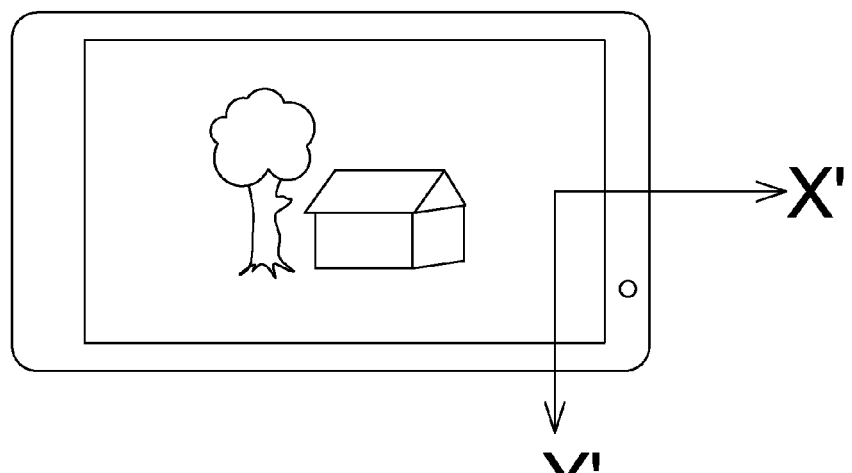
Figure 2A:
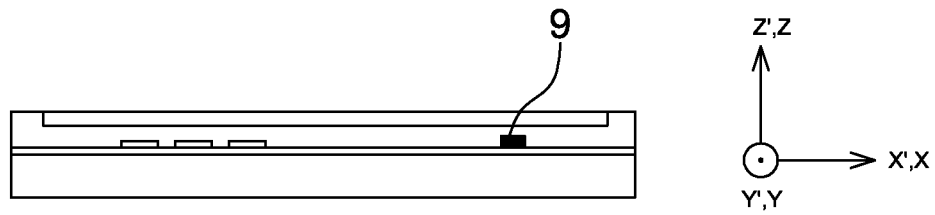
FIGS. 2A and 2B show dimensional axes of a conventional portable electronic device being identical to detecting axes of an acceleration sensor.
Figure 2B:
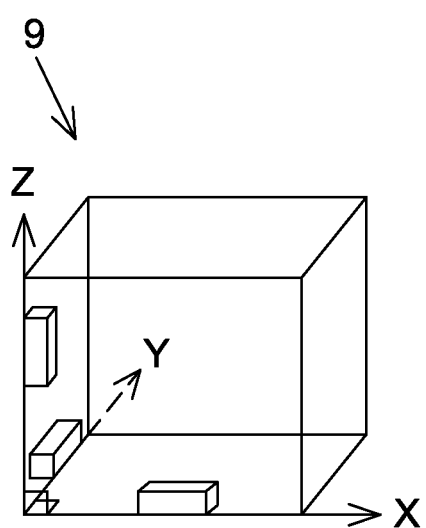

Compared to the conventional portable electronic device shown in FIGS. 2A and 2B, in the present disclosure, when the portable electronic device 1 is put on a table surface or operated by the user in a lying position, that is, the normal direction Z' of the display surface 11d of the display device 11 is parallel to the vertical line of space, as the Z-direction of the acceleration $a_Z$ detected by the third detecting sensor array 123 of the acceleration sensor 12 deviates from the Z'-direction by the shift angle θ, the rotation angle is detectable effectively. In this manner, the display device 11 is able to change the displaying direction of the displayed image according to the detected rotation angle.

Figure 5A:
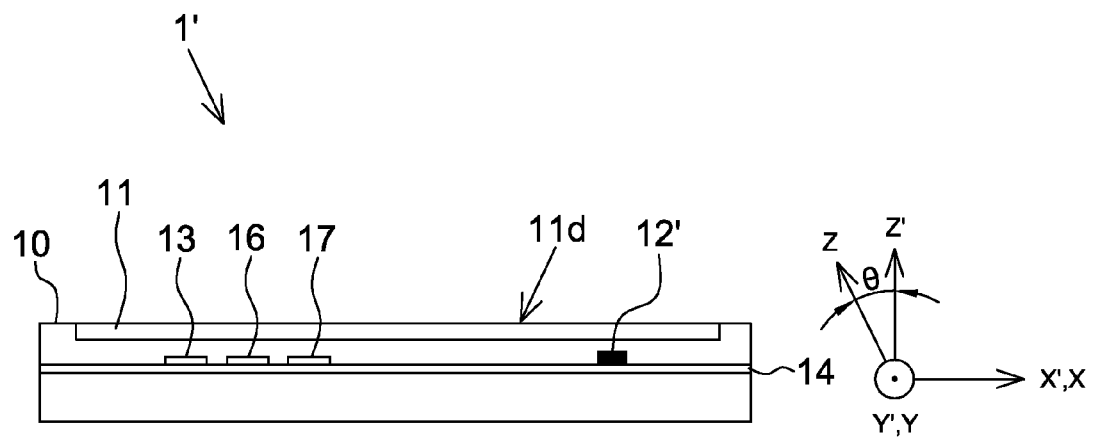
FIG. 5A is a cross sectional view of a portable electronic device according to a second embodiment of the present disclosure.

Referring to FIG. 5A, it is a cross sectional view of a portable electronic device according to a second embodiment of the present disclosure. The difference between this embodiment and the first embodiment is that in the second embodiment an acceleration sensor 12' as well as the processing unit 13, the memory unit 16 and the power IC 17 are disposed on the same or different surfaces of the first circuit board 14. In order to achieve the same effect as the first embodiment, the arrangement of detecting sensor arrays in the acceleration sensor 12' is different from that in the acceleration sensor 12.

Figure 5B:
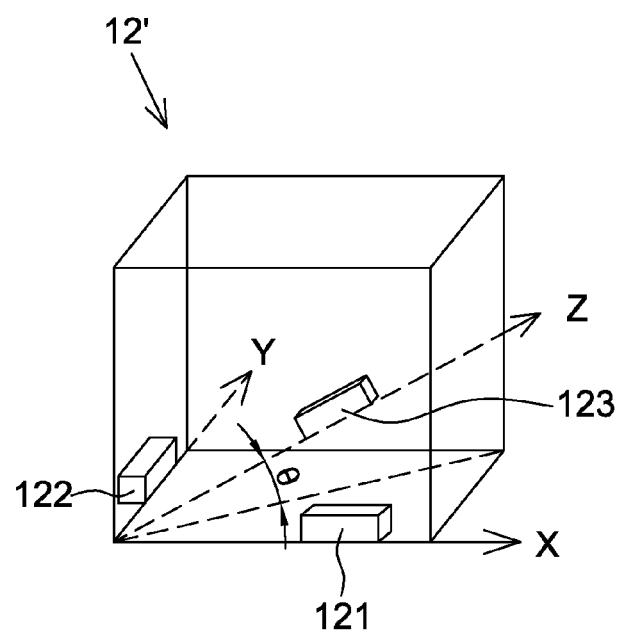
FIG. 5B is a schematic diagram of an acceleration sensor of the portable electronic device according to the second embodiment of the present disclosure.

Referring to FIG. 5B, it is a schematic diagram of an acceleration sensor for the portable electronic device according to the second embodiment of the present disclosure. The acceleration sensor 12' also includes the first detecting sensor array 121, the second detecting sensor array 122 and the third detecting sensor array 123. In this embodiment, the third detecting sensor array 123 is not perpendicular to the first detecting sensor array 121 and the second detecting sensor array 122. The third detection array 123 has a shift angle θ (θ≠90°) from a plane on which the first detecting sensor array 121 and the second detecting sensor array 122 are disposed. Accordingly, the portable electronic device 1' does not further include a second circuit board 15, and the acceleration sensor 12' is directly disposed on the upper surface or the lower surface of the first circuit board 14. Therefore, when the acceleration sensor 12' is disposed on the first circuit board 14, the first detecting sensor array 121 and the second detecting sensor array 122 are parallel to the display surface 11d, whereas the third detecting sensor array 123 and the display surface 11d form the shift angle θ therebetween.

In the above first and second embodiments, as the processing unit 13 is configured to calculate a tilt angle θt using equation (1) directly according to the three-dimensional acceleration detected by the acceleration sensor 12, e.g. including the first acceleration $a_X$, the second acceleration $a_Y$ and the third acceleration $a_Z$, the obtained tilt angle θt includes the effect of the shift angle θ. Accordingly, the processing unit 13 may further correct the tilt angle θt using the shift angle θ so as to obtain a corrected tilt angle (θt±θ), which indicates an actual tilt angle of the display surface 11d.

In addition, the acceleration sensor 12(12') does not correctly calculate the three-dimensional acceleration in all operating conditions, e.g. when the Z-direction being perpendicular to the horizontal plane of space. Accordingly, in the above first and second embodiments, the processing unit 13 further identifies whether the obtained tilt angle θt or corrected tilt angle (θt±θ) is within an operable angle range to avoid errors. For example, when the processing unit 13 is configured to identify the corrected tilt angle (θt±θ), as the corrected tilt angle (θt±θ) does not include the effect of the shift angle θ, the processing unit 13 identifies whether the corrected tilt angle (θt±θ) is within a predetermined angle range, wherein the predetermined angle range is, for example, a detectable tilt angle range, which is previously stored in the memory unit 16, of the acceleration sensor 12 itself. In addition, when the processing unit 13 is configured to identify the tilt angle θt, as the tilt angle θt includes the effect of the shift angle θ, the processing unit 13 identifies whether the tilt angle θt is within a corrected angle range, wherein the corrected angle range is obtained by correcting the predetermined angle range with the shift angle θ. In the present disclosure, the corrected angle range and the predetermined angle range are respectively configured to define an operable angle of the tilt angle θt and the corrected tilt angle (θt±θ), wherein the predetermined angle range does not cover the tilt angle at ±90 degrees whereas the corrected angle range covers the tilt angle at ±90 degrees.

Figure 6A:
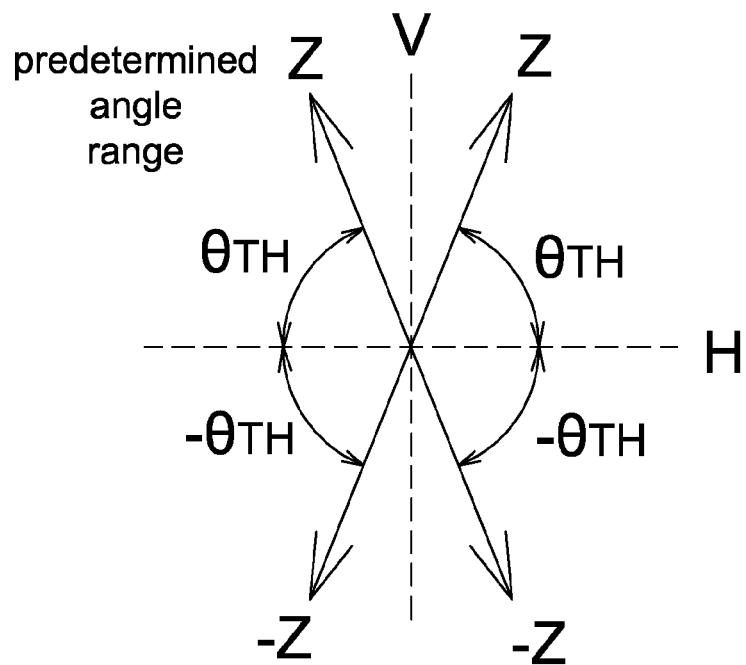
FIG. 6A is a schematic diagram of a predetermined angle range of the tilt angle in a portable electronic device according to one embodiment of the present disclosure.
Figure 6B:
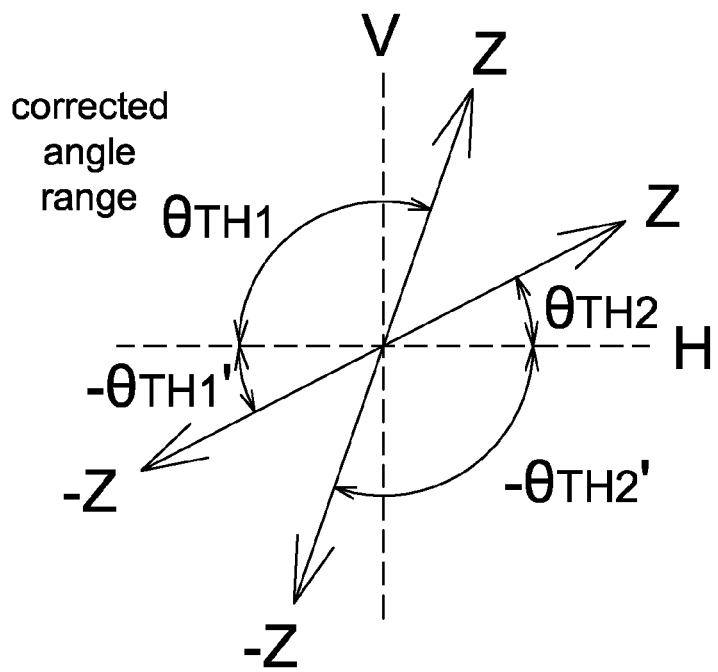
FIG. 6B is a schematic diagram of a corrected angle range of the tilt angle in a portable electronic device according to one embodiment of the present disclosure.

Referring to FIG. 6A, the predetermined angle range, for example, is within a tilt angle range $\theta_{TH}$ to $-\theta_{TH}$ of the display surface 11d, wherein $\theta_{TH}$ and $-\theta_{TH}$ are substantially symmetrical in respect of the horizontal plane H of space as shown. As the tilt angle detected by the conventional cell phone does not include the effect of the shift angle θ described in the present disclosure, the rotation angle is not detectable at ±90 degrees of the tilt angle conventionally. Referring to FIG. 6B, the corrected angle range is, for example, within a tilt angle range $\theta_{TH1}$ to $-\theta_{TH1}'$ and $\theta_{TH2}$ to $-\theta_{TH2}'$ of the display surface 11d, wherein $\theta_{TH1}$ and $-\theta_m'$, $\theta_{TH2}$ and $-\theta_{TH2}'$ are not symmetrical in respect of the horizontal plane H of space as shown. In one embodiment, $\theta_{TH1}=\theta_{TH}+\theta$, $-\theta_{TH1}'=-\theta_{TH}+\theta$, $\theta_{TH2}'=\theta_{TH}-\theta$ and $-\theta_{TH2}'=-\theta_{TH}-\theta$, but not limited thereto. In FIGS. 6A and 6B, the term "V" indicates the vertical direction of space and the term "H" indicated the horizontal direction of space.

When the processing unit 13 identifies that the tilt angle θt or the corrected tilt angle (θt±θ) is within the operable angle range, the processing unit 13 calculates a rotation direction according to the three-dimensional acceleration, e.g. calculating a rotation angle $\theta_0$ according to equation (2) below. In the present disclosure, the rotation angle $\theta_0$ is defined as an angle of clockwise or counterclockwise rotating the portable electronic device about the Z-direction.

$$\theta_o = -\tan^{-1}\frac{-a_X}{a_Y} \tag{2}$$

When the rotation angle $\theta_0$ exceeds a rotation threshold, for example, but not limited to, 30 degrees to 60 degrees of the rotation angle, the processing unit 13 generates a direction control signal Sc to control the display device 11 so as to change the displaying direction of the image according to the rotation angle.

Accordingly, a rotation detection method for the portable electronic device according to this embodiment includes the steps of: calculating a tilt angle of a portable electronic device in a three-dimensional space according to a three-dimensional acceleration detected by an acceleration sensor; correcting one of the tilt angle or a predetermined angle range according to a shift angle smaller than 90 degrees between at least one detecting sensor array of the acceleration sensor and a display surface of a display device; and when an operable angle is satisfied, calculating a rotation direction according to the three-dimensional acceleration. Two embodiments are taken as examples for illustration.

Figure 7A:
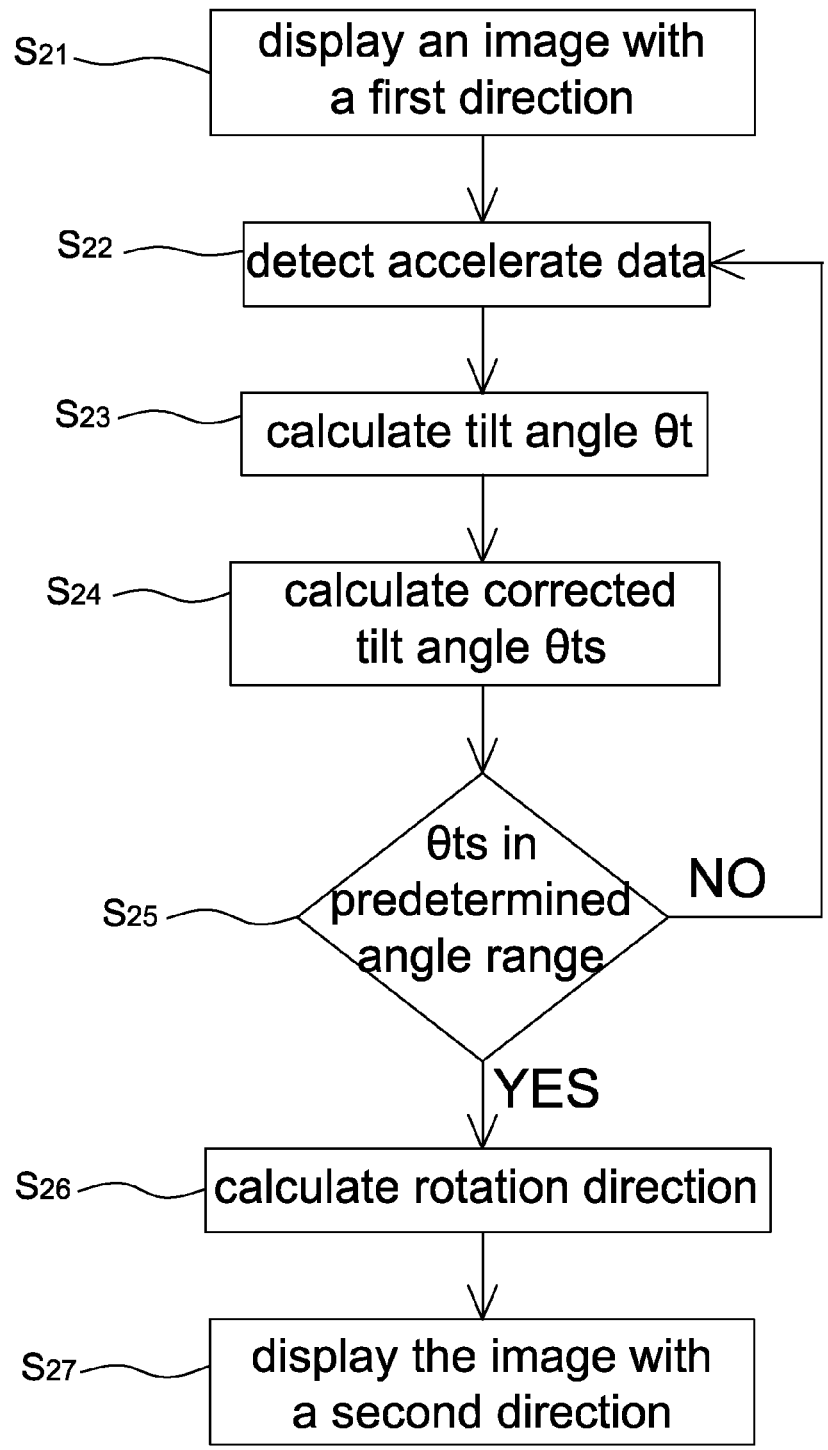
FIGS. 7A and 7B are flow charts of the rotation detection method for a portable electronic device according to some embodiments of the present disclosure.

Referring to FIG. 7A, it is a flow chart of a rotation detection method for a portable electronic device according to one embodiment of the present disclosure, which is adaptable to the portable electronic devices 1 and 1' of the above first and second embodiments. As mentioned above, the acceleration sensor 12 (12') according to some embodiments of the present disclosure is configured to detect a first acceleration $a_X$ along an X-direction parallel to a display surface 11*d* of the display device 11 (as FIG. 5A) or a first acceleration $a_X$ along an X-direction forming the shift angle θ from a display surface 11*d* of the display device 11 (as FIG. 3A), to detect a second acceleration $a_Y$ along a Y-direction parallel to the display surface 11*d* (as FIGS. 3A and 5A), and to detect a third acceleration $a_Z$ along a Z-direction forming the shift angle θ from a normal direction of the display surface 11*d* (as FIGS. 3A and 5A).

The rotation detection method of this embodiment includes the steps of: displaying an image with a first direction (Step $S_{21}$); detecting acceleration data (Step $S_{22}$); calculating a tilt angle (Step $S_{23}$); calculating a corrected tilt angle (Step $S_{24}$); identifying whether the corrected tile angle is within a predetermined angle range (Step $S_{25}$); calculating a rotation direction (Step $S_{26}$); and displaying the image with a second direction (Step $S_{27}$). Referring to FIGS. 3A, 4, 5A and 7A together, details of this embodiment is then illustrated. FIG. 4 is a block diagram of the portable electronic device according to one embodiment of the present disclosure, which is adaptable to the above first and second embodiments.

Step $S_{21}$: Firstly, the display device 11 displays an image with a first displaying direction, e.g. in a transverse or longitudinal direction.

Step $S_{22}$: The acceleration sensor 12 (12') detects a first acceleration $a_X$, a second acceleration $a_Y$ and a third acceleration $a_Z$ (i.e. three-dimensional acceleration) respectively with the first detecting sensor array 121, the second detecting sensor array 122 and the third detecting sensor array 123, and the three-dimensional acceleration is transmitted to the processing unit 13.

Step $S_{23}$: The processing unit 13 calculates, for example using equation (1), a tilt angle θt of the portable electronic device 1 (1') in a three-dimensional space according to the first acceleration $a_X$, the second acceleration $a_Y$ and the third acceleration $a_Z$.

Step $S_{24}$: In the present disclosure as the tilt angle θt includes the effect of the shift angle θ, the processing unit 13 then corrects the tilt angle θt with the shift angle θ and generates a corrected tilt angle θts=(θ±θt) so as to correctly represent the tilt angle of the display surface 11*d*.

Step $S_{25}$: The processing unit 13 compares the corrected tilt angle θts with a predetermined angle range (as FIG. 6A) previously stored in the memory unit 16 so as to confirm whether the corrected tilt angle θts is within an operable angle range ($\pm\theta_{TH}$), wherein in one embodiment, the predetermined angle range is within −75 to 75 degrees, but not limited thereto. When the corrected tilt angle θts is not within the predetermined angle range, the corrected tilt angle θts may not be suitable for identifying the rotation and the processing unit 13 does not identify a rotating operation and receives a next three-dimensional acceleration detected by the acceleration sensor 12 (12') in a next detecting interval, i.e. returning to the Step $S_{22}$. When the corrected tilt angle θts is within the predetermined angle range (i.e. satisfying the operable angle), the Step $S_{26}$ is entered.

Step $S_{26}$: The processing unit 13 calculates, e.g. using equation (2), a rotation angle and a rotation direction in a three-dimensional space according to the first acceleration $a_X$ and the second acceleration $a_Y$.

Step $S_{27}$: When the calculated rotation angle is larger than a rotation threshold, the processing unit 13 generates a direction control signal Sc to the display device 11 so as to change the first displaying direction to a second displaying direction, e.g. changing to a longitudinal or transverse direction.

Figure 7B:
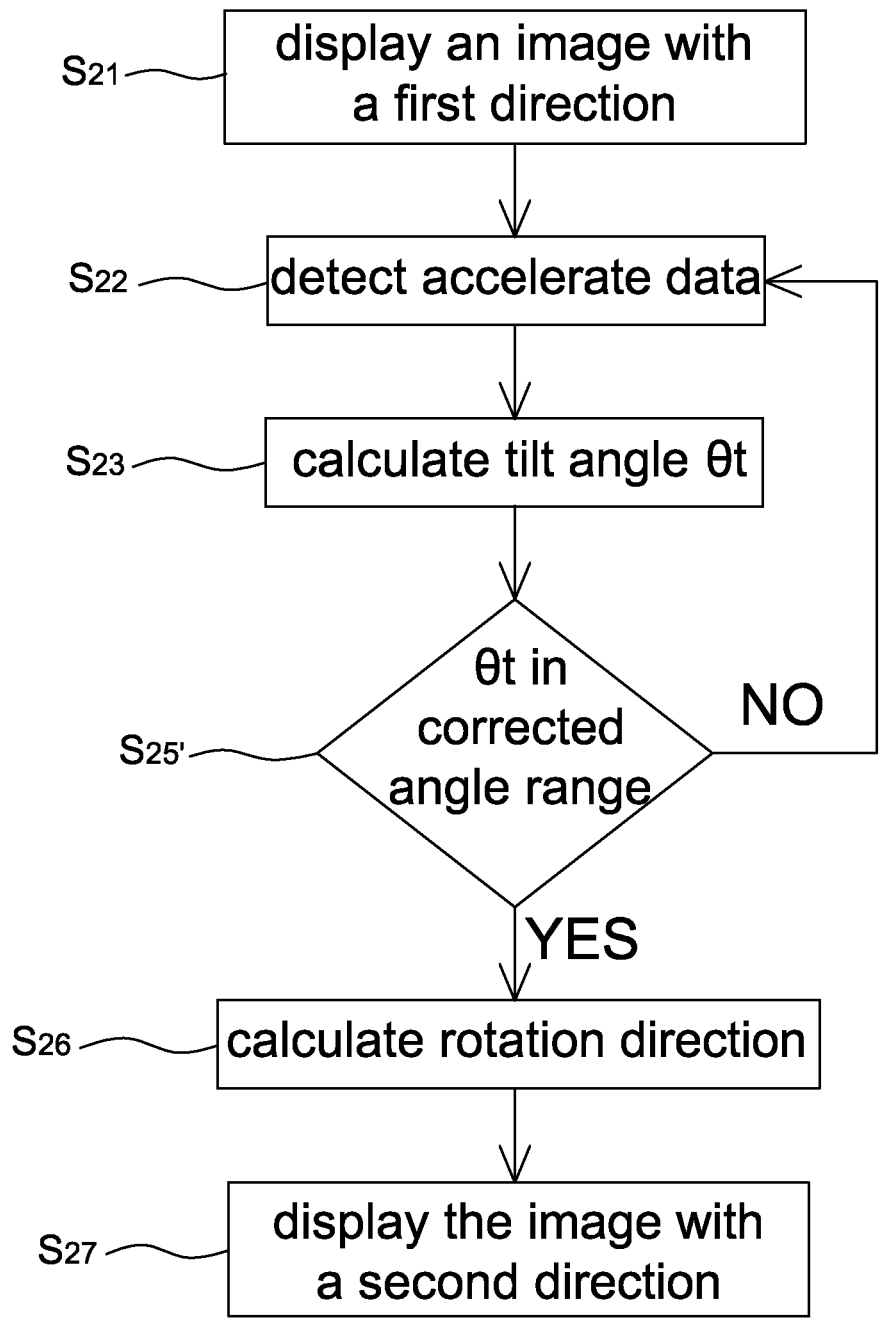

Referring to FIG. 7B, it is a flow chart of another rotation detection method for a portable electronic device according to one embodiment of the present disclosure, which is also adaptable to the portable electronic devices 1 and 1' of the above first and second embodiments. The difference between this embodiment and FIG. 7A is that in FIG. 7B the processing unit 13 does not correct the tilt angle θt (i.e. not including the Step $S_{24}$) but directly compares the tilt angle θt with a corrected angle range (as FIG. 6B) previously stored in the memory unit 16 so as to confirm whether the tilt angle θt is within an operable angle range ($\theta_{TH1}$ to $-\theta_{TH1}'$, $\theta_{TH2}$ to $-\theta_{TH2}'$). When the tilt angle θt is within the operable angle range (kw to $-\theta_{TH1}'$, $\theta_{TH2}$ to $-\theta_{TH2}'$), i.e. satisfying the operable angle, the Step $S_{26}$ is entered; otherwise return to the Step $S_{22}$ to allow the acceleration sensor 12 (12') to detect a next three-dimensional acceleration. In this embodiment, the steps having identical reference numbers as FIG. 7A have similar operations and thus details thereof are not repeated herein.

It is appreciated that FIGS. 7A and 7B do not show some steps such as filtering, coordinate conversion and identifying whether a rotation operation is performed since these omitted steps are not the object of the present disclosure. The present disclosure is to provide a portable electronic device capable of detecting the rotation direction according to actually existing operating conditions.

Figure 8:
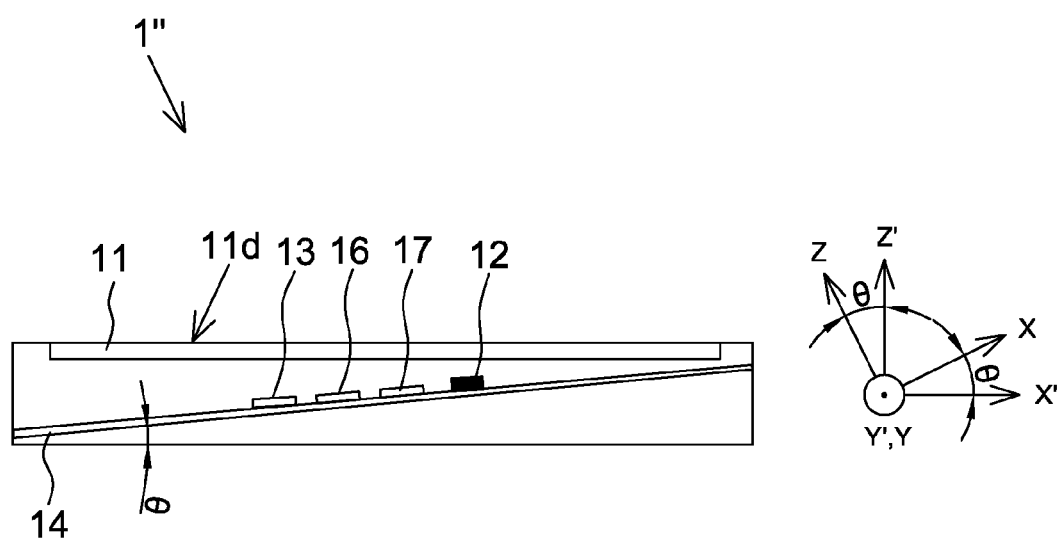
FIG. 8 is a cross sectional view of a portable electronic device according to an alternative embodiment of the present disclosure.

In addition, the present disclosure may be implemented through other methods as long as the third detecting sensor array for detecting the third acceleration $a_Z$ shifts from the normal direction Z' of the display surface 11d by the shift angle θ, wherein the shift angle θ is smaller than 90 degrees (not including 0 degree and larger than 0 degree). For example, the acceleration sensor 12 and the processing unit 13 of FIG. 3B are both disposed on the first circuit board 14, but the upper and lower surfaces of the first circuit board 14 shift from the display surface 11d by the shift angle θ as shown in FIG. 8, and herein the first detecting sensor array 121 and the second detecting sensor array 122 are parallel to the upper and lower surfaces of the first circuit board 14, and the third detecting sensor array 123 is perpendicular to the upper and lower surfaces of the first circuit board 14 but shifts from the normal direction of the display surface 11d by the shift angle θ (or from the display surface 11d by the complement angle, i.e. 90-θ, of the shift angle θ). Or it is able to use particular packaging to allow the Z-direction of the third acceleration $a_Z$ to shift from the normal direction Z' of the display surface 11d by the shift angle θ (or from the display surface 11d by the complement angle, i.e. 90-θ, of the shift angle θ) when the acceleration sensor 12 of FIG. 3B is disposed on the first circuit board 14, and herein the first detecting sensor array 121, the second detecting sensor array 122 and the third detecting sensor array 123 are perpendicular to one another. As the acceleration sensor 12 is disposed on the first circuit board 14 in a tilt manner, at least one detecting sensor array (e.g. the third detecting sensor array 123) thereof forms a shift angle θ, which is smaller 90 degrees, from the display surface 11d.

It should be mentioned that in the first embodiment of the present disclosure, the second circuit board 15 is shown to only be disposed with the acceleration sensor 12 so as to reduce the size of the second circuit board 15. However, in other embodiments, a part of elements disposed on the first circuit board 14 may be disposed on the second circuit board 15 without particular limitation.

As mentioned above, the conventional technology is not able to detect the rotation angle when a display surface of the display device is parallel to the spatial horizontal plane such that the limitation is caused in operation. Therefore, the present disclosure further provides a portable electronic device (FIGS. 3A, 5A and 8) and a rotation detection method thereof (FIGS. 7A and 7B) that have undetectable rotation angles at the tilt angle rarely operated by the user in actual operation such that usage inconvenience is not caused. In addition, the current software program can be adapted to the portable electronic device of the present disclosure as long as the tilt angle or the range of operable tilt angle is corrected, and a high adaptability is realized.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A portable electronic device, comprising:
a display device having a display surface and configured to display an image;
an acceleration sensor configured to detect a three-dimensional acceleration;
a processing unit configured to calculate a tilt angle of the portable electronic device in a three-dimensional space according to the three-dimensional acceleration;
a first circuit board having a first surface parallel to the display surface, wherein the display device is electrically connected to the first circuit board; and
a second circuit board electrically connected to the first circuit board and having a second surface, wherein the second surface and the first surface form a shift angle smaller than 90 degrees therebetween, and the acceleration sensor is disposed on the second surface.

2. The portable electronic device as claimed in claim 1, wherein the processing unit is disposed on the first surface and configured to correct the tilt angle according to the shift angle.

3. The portable electronic device as claimed in claim 1, wherein the processing unit is further configured to identify whether the tilt angle is within a corrected angle range obtained by correcting a predetermined angle range with the shift angle, and
the corrected angle range and the predetermined angle range are configured to define an operable angle, and the predetermined angle range does not cover ±90 degrees of the tilt angle whereas the corrected angle range covers ±90 degrees of the tilt angle.

4. The portable electronic device as claimed in claim 1, wherein the processing unit is further configured to calculate a rotation direction of the portable electronic device in the three-dimensional space according to the three-dimensional acceleration, and the display device is configured to display the image according to the rotation direction.

5. The portable electronic device as claimed in claim 1, wherein the shift angle is between 15 degrees and 35 degrees.

6. The portable electronic device as claimed in claim 1, wherein the second circuit board is electrically connected to the first circuit board through a flexible printed circuit board.

7. The portable electronic device as claimed in claim 1, wherein the acceleration sensor comprises a first detecting sensor array, a second detecting sensor array and a third detecting sensor array configured to detect the three-dimensional acceleration; the first detecting sensor array and the display surface form the shift angle therebetween; the second detecting sensor array is parallel to the display surface; and the third detecting sensor array and a normal direction of the display surface form the shift angle therebetween.

8. The portable electronic device as claimed in claim 7, wherein the first detecting sensor array, the second detecting sensor array and the third detecting sensor array are arranged perpendicular to one another.

9. A portable electronic device, comprising:
a display device having a display surface and configured to display an image;
an acceleration sensor comprising a plurality of detecting sensor arrays and configured to detect a three-dimensional acceleration, wherein at least one of the plurality of detecting sensor arrays and the display surface form a shift angle smaller than 90 degrees therebetween; and
a processing unit configured to calculate a tilt angle of the portable electronic device in a three-dimensional space according to the three-dimensional acceleration.

10. The portable electronic device as claimed in claim 9, wherein the plurality of detecting sensor arrays comprises a first detecting sensor array, a second detecting sensor array and a third detecting sensor array; the first detecting sensor array and the display surface form the shift angle therebetween; the second detecting sensor array is parallel to the display surface; and the third detecting sensor array and a normal direction of the display surface form the shift angle therebetween.

11. The portable electronic device as claimed in claim 9, further comprising:
a first circuit board having a first surface parallel to the display surface, wherein the display device is electrically connected to the first circuit board, wherein the acceleration sensor is disposed on the first surface, and wherein the plurality of detecting sensor arrays comprises a first detecting sensor array, a second detecting sensor array and a third detecting sensor array, the first detecting sensor array and the second detecting sensor array are parallel to the first surface, and the third detecting sensor array and the first surface form the shift angle therebetween.

12. The portable electronic device as claimed in claim 9, wherein the processing unit is further configured to correct the tilt angle with the shift angle.

13. The portable electronic device as claimed in claim 9, wherein the processing unit is further configured to identify whether the tilt angle is within a corrected angle range obtained by correcting a predetermined angle range with the shift angle, and
the corrected angle range and the predetermined angle range are configured to define an operable angle, and the predetermined angle range does not cover ±90 degrees of the tilt angle whereas the corrected angle range covers ±90 degrees of the tilt angle.

14. The portable electronic device as claimed in claim 9, wherein the processing unit is further configured to calculate a rotation direction of the portable electronic device in the three-dimensional space according to the three-dimensional acceleration, and the display device is configured to display the image according to the rotation direction.

15. The portable electronic device as claimed in claim 9, wherein the shift angle is between 15 degrees and 35 degrees.

16. A rotation detection method for a portable electronic device, the portable electronic device comprising a display device, a circuit board and an acceleration sensor electrically coupled to the circuit board, the acceleration sensor being configured to detect a three-dimensional acceleration and comprising at least one detecting sensor array having a shift angle smaller than 90 degrees from a display surface of the display device, the rotation detection method comprising:
calculating a tilt angle of the portable electronic device in a three-dimensional space according to the three-dimensional acceleration;
correcting the tilt angle by the shift angle to generate a corrected tilt angle or correcting a predetermined angle range by the shift angle to generate a corrected angle range;
comparing the tilt angle with the corrected angle range or comparing the corrected tilt angle with the predetermined angle range; and
calculating a rotation direction according to the three-dimensional acceleration when the tilt angle is within the corrected angle range or the corrected tilt angle is within the predetermined angle range.

17. The rotation detection method as claimed in claim 16, wherein the corrected angle range and the predetermined angle range are configured to define an operable angle, and the predetermined angle range does not cover ±90 degrees of the tilt angle whereas the corrected angle range covers ±90 degrees of the tilt angle.

18. The rotation detection method as claimed in claim 16, further comprising:
changing a displaying direction of an image on the display device according to the rotation direction.

* * * * *